(12) United States Patent
Wallach et al.

(10) Patent No.: US 8,076,855 B2
(45) Date of Patent: Dec. 13, 2011

(54) COMBINATION EMERGENCY LIGHT AND NIGHTLIGHT

(75) Inventors: Stewart Wallach, Delray Beach, FL (US); Yi-Chuan Liu, Taipei (TW)

(73) Assignee: Capstone Industries, Inc., Deerfield Beach, FL (US)

( * ) Notice: Subject to any disclaimer, the term of this patent is extended or adjusted under 35 U.S.C. 154(b) by 665 days.

(21) Appl. No.: 12/209,209

(22) Filed: Sep. 12, 2008

(65) Prior Publication Data

US 2010/0066250 A1    Mar. 18, 2010

(51) Int. Cl.
*H05B 41/14* (2006.01)
(52) U.S. Cl. .............................. 315/86; 315/90; 362/641
(58) Field of Classification Search .................. 315/177, 315/160, 161, 172, 209 R, 218, 312; 362/188, 362/183, 200, 194, 197, 199, 205, 207, 208, 362/167, 213, 640, 641, 642, 226, 227, 233, 362/234, 249, 250, 251, 253, 254, 386, 432
See application file for complete search history.

(56) References Cited

U.S. PATENT DOCUMENTS

2005/0237734 A1* 10/2005 Krieger .......................... 362/157
2009/0180271 A1* 7/2009 Jachmann ........................ 362/20

* cited by examiner

*Primary Examiner* — Douglas W Owens
*Assistant Examiner* — Jianzi Chen

(57) ABSTRACT

A light device includes a nightlight unit adapted to operate in an automatic mode, an on mode, or an off mode; an illumination unit comprising a sensor, the illumination unit being removably secured to the nightlight unit; and a charging unit for charging the illumination unit. The lighting unit is adapted to come on automatically by operating in the automatic mode, continuously emit light by operating in the on mode, or stop emitting light by operating in the off mode. The illumination unit is adapted to come on automatically to emit light either when the sensor senses an activating condition in the form of an absence of AC or after removing from the nightlight unit. The sensor is adapted to disable the illumination unit either when sensing a termination of the activating condition or after placing the illumination unit in the nightlight unit and electrically connecting thereto.

2 Claims, 3 Drawing Sheets

COMBINATION EMERGENCY LIGHT AND NIGHTLIGHT

BACKGROUND OF THE INVENTION

1. Field of Invention

The invention relates to emergency lights and nightlights, for illuminating an area of a wall in a hallway, kitchen, bedside area or any household area that might need emergency lighting and more particularly to a small light being rechargeable by induction charging, and an illumination unit thereof being adapted to remove from the light to be used as a portable light.

2. Description of Related Art

Emergency light is a battery powered lighting device that comes on automatically when a building experiences a power outage or in the event of fire. However, conventional emergency lights are bulky and thus are not portable.

There have been numerous suggestions in prior patents for emergency light. For example, U.S. Pat. No. 6,336,729 discloses an emergency light device.

Nightlights are well known small light sources and are typically in indoor dark area.

Thus, continuing improvements in the exploitation of combination emergency light and nightlight are constantly being sought.

SUMMARY OF THE INVENTION

It is therefore one object of the invention to provide an induction charged rechargeable light, which when plugged into an AC 120 v electrical wall outlet can be used as nightlight. Moreover, the light has an illumination unit served as an emergency light during power outages. The illumination unit is also removable so as to be used independently as a portable light.

The above and other objects, features and advantages of the invention will become apparent from the following detailed description taken with the accompanying drawings.

DETAILED DESCRIPTION OF THE INVENTION

Figure 1:
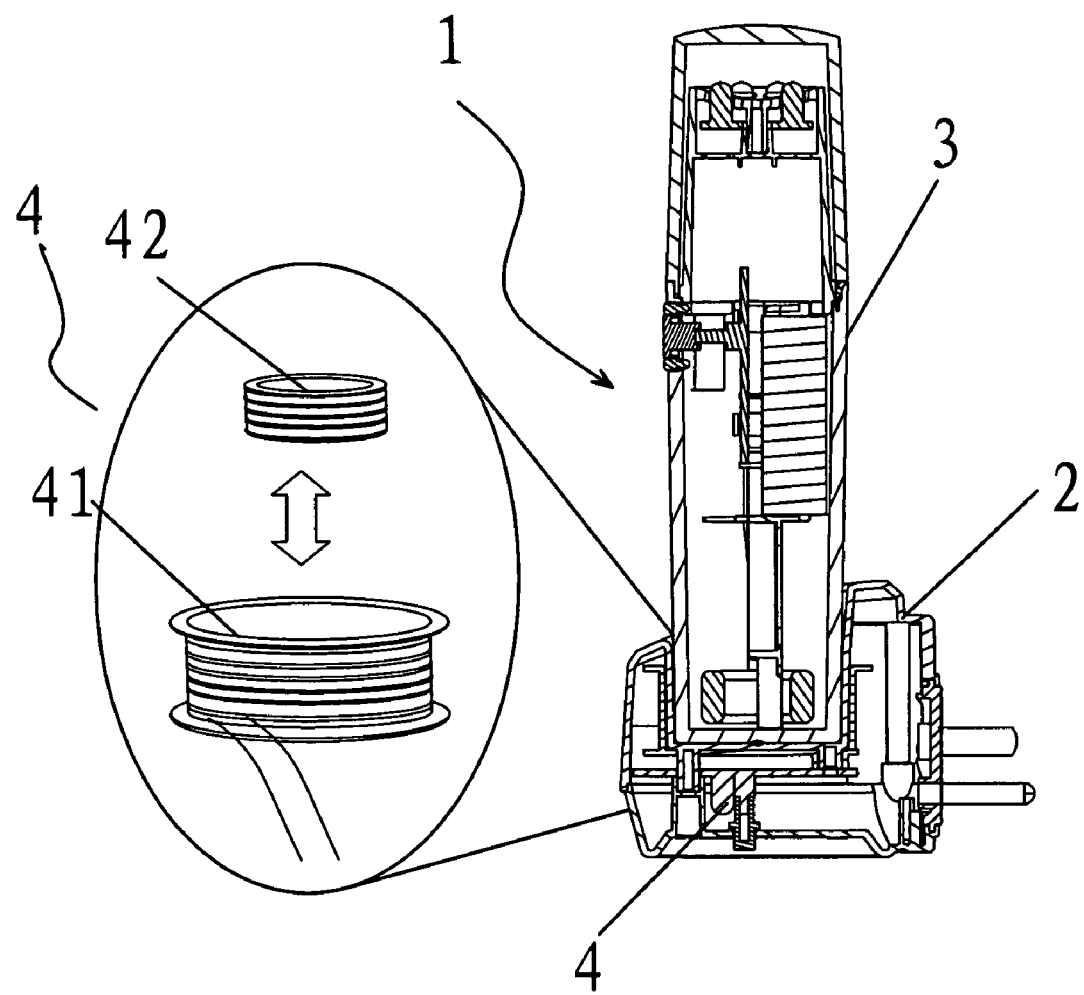
FIG. 1 is a side elevation of a preferred embodiment of light according to the invention.

Referring to FIG. 1, a light 1 in accordance with a preferred embodiment of the invention is shown. The light 1 is small and aims to illuminate an area of a wall in a hallway, kitchen, bedside area or any household area that might need emergency lighting. The light 1 comprises a nightlight 2, an illumination unit 3, and a transformer 4.

The illumination unit 3 is cylindrical as shown. Alternatively, the illumination unit 3 can be shaped other than cylinder. The illumination unit 3 can be used as a portable light as detailed later.

The transformer 4 comprises a large winding 41 mounted in the nightlight 2, and a small winding 42 mounted in the illumination unit 3. Alternatively, the small winding 42 is mounted in the nightlight 2 and the large winding 41 is mounted in the illumination unit 3 in other embodiments. The large winding 41 is adapted to generate electromagnetic induction by co-acting with the small winding 42 for charging and achieving other purposes as detailed later.

Figure 2:
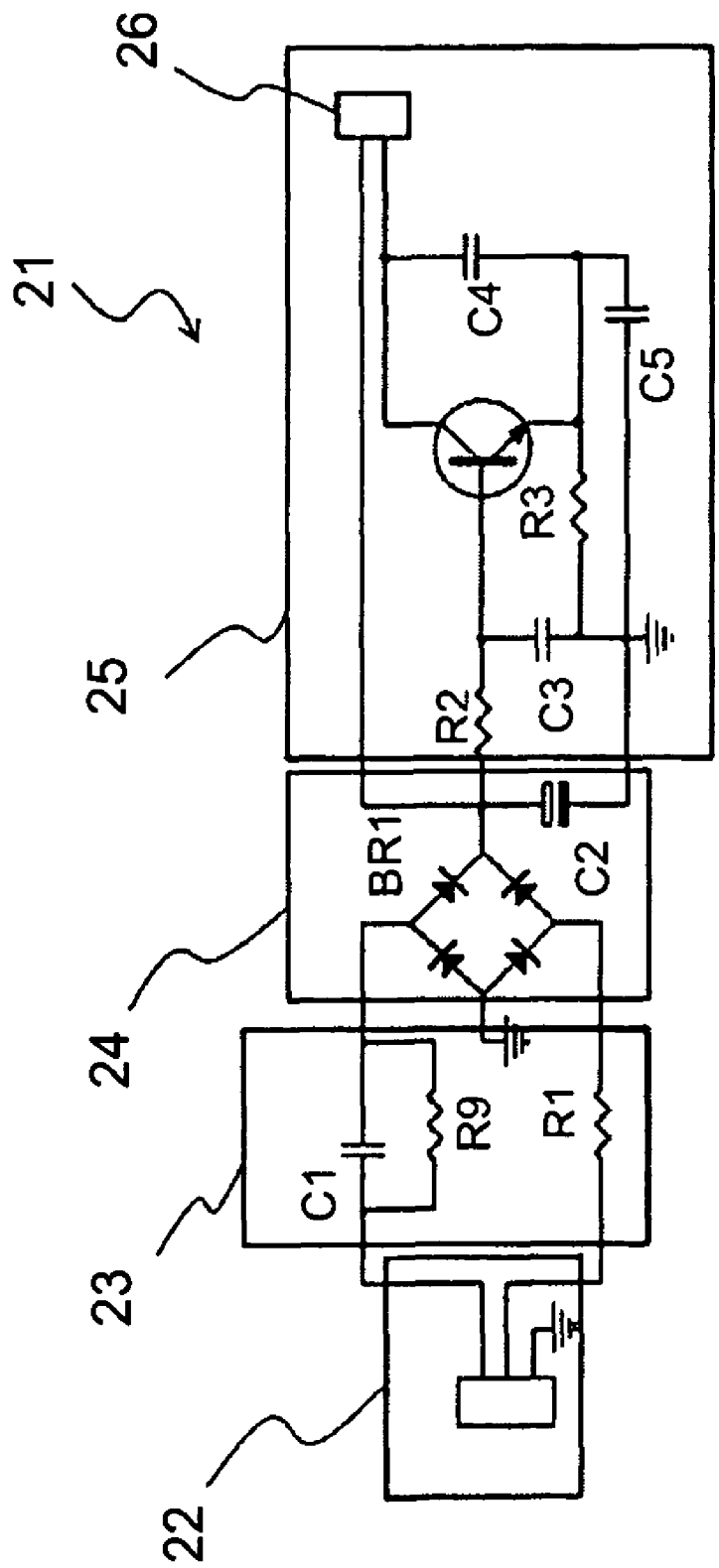
FIG. 2 is a detailed circuit representation of the charging unit of FIG. 1.

Referring to FIG. 2 specifically, the components of the nightlight 2 are discussed in detail below. The nightlight 2 is adapted to mate with, for example, a wall outlet to obtain AC (alternating current) power (e.g., 120V AC) therefrom. The nightlight 2 comprises two light-emitting diodes (LEDs) (not shown), an auto/on/off selector switch (not shown), a sensor (not shown), and a charging unit 21 including an input 22, a voltage decreasing circuit 23, a full-wave rectifier 24, a vibration circuit 25, and an output 26.

For example, AC 120V power is supplied from a wall outlet to the input 22. And in turn, voltage value of the AC power is decreased by the voltage decreasing circuit 23 which comprises series connected capacitor C1 and resistor R1 and resistor R9 which is parallel connected to capacitor C1. Voltage with decreased value is in turn rectified and filtered by the full-wave rectifier 24 which comprises a bridge rectifier BR1 for rectifying purpose and a capacitor C2 for filtering. The vibration circuit 25 then generates a vibration signal to the output 26. Finally, the vibration signal is sent from the output 26 to the large winding 41. The vibration circuit 25 comprises capacitors C3, C4, C5, resistors R2, R3, and transistor Q1.

Figure 3:
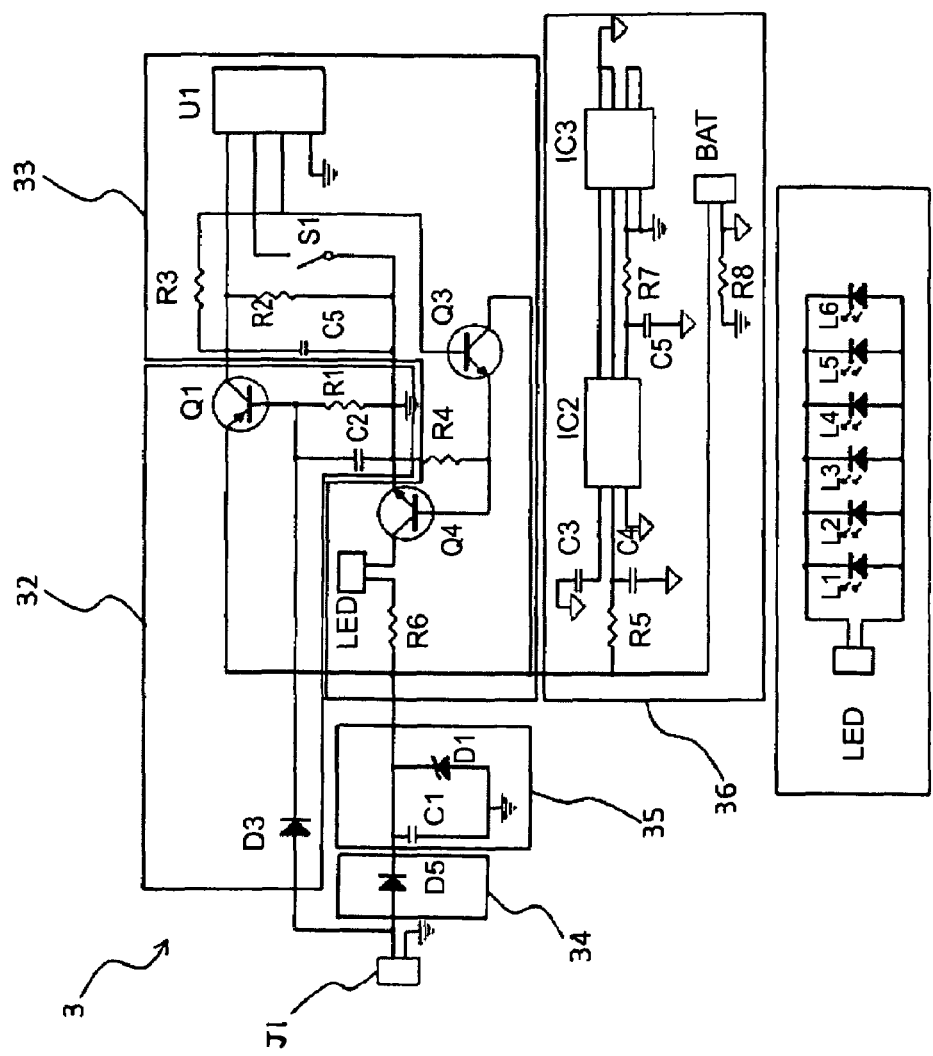
FIG. 3 is a detailed circuit representation of the illumination unit of FIG. 1.

Referring to FIG. 3 specifically, the components of the illumination unit 3 are discussed in detail below. The illumination unit 3 comprises a jack J1, an electromagnetic induction control circuit 32, a display control circuit 33, a half-wave rectifier 34, a voltage stabilizing circuit 35, a lithium battery protection circuit 36, a sensor (not shown), and an on/off switch (not shown).

The small winding 42 is electrically connected to the jack J1. AC energy is transferred from the large winding 41 to the small winding 42 when an electromagnetic induction is generated. AC is then rectified by diode D3 so as to control the cut-off and conduction of transistors Q3, Q4. And in turn, on, off, and blinking of six LEDs L1, L2, L3, L4, L5, and L6 (see an enlarged view of "LED" on the bottom of FIG. 3) can be controlled by the transistors Q3, Q4 during charging. Preferably, dim, bright, and blinking of the LEDs L1 to L6 means fully charged, activation, and charging states of the illumination unit 3 respectively.

The electromagnetic induction control circuit 32 comprises diode D3, resistor R1, capacitor C2, and transistor Q1. The display control circuit 33 comprises a switch S1, resistors R2, R3, R4, R6, a capacitor C5, transistors Q3, Q4, an integrated circuit (IC) U1, and six LEDs L1, L2, L3, L4, L5, and L6. Note that the number of LEDs can be more or less in other embodiments.

Diode D5 of the half-wave rectifier 34 is for rectifying the AC energy supplied from the jack J1 to generate DC (direct current). Zener Diode D1 and capacitor C1 of the voltage stabilizing circuit 35 are for voltage stabilization and filter. Resistor R6 of the display control circuit 33 is for limiting voltage value. States of transistors Q3, Q4, and IC U1 can be controlled by switching the switch S1 on or off by triggering. As a result, on, off, and blinking of the LEDs L1, L2, L3, L4, L5, and L6 can be controlled.

The lithium battery protection circuit 36 is electrically connected to the display control circuit 33. The lithium battery protection circuit 36 comprises resistors R5, R7, R8, capacitors C3, C4, C5, and ICs IC2, IC3. IC IC2 is for monitoring the charging voltage of a rechargeable lithium battery BAT in order to prevent over voltage or over current (i.e., overcharging) from occurring. Moreover, IC IC2 is for monitoring whether the lithium battery BAT is too low or a short circuit being occurred during discharge. The IC IC3 is adapted to disable the circuit for the protection of the lithium battery BAT if any irregularity occurs.

An individual may insert prongs (not numbered) of the light 1 into, for example, a wall outlet to activate the charging unit 21 so as to charge the rechargeable lithium battery BAT of the illumination unit 3 by transferring AC energy by electromagnetic induction from the large winding 41 in the nightlight 2 to the small winding 42 in the illumination unit 3. The charging will be stopped when the rechargeable lithium battery BAT is fully charged.

The light 1 can be used as a typical nightlight. For example, an individual may slide the selector switch to auto mode so that the nightlight 2 is adapted to turn on automatically when surrounding area becomes dark because it has a sensor. Alternatively, the individual may slide the selector switch to on mode so that the nightlight 2 may be on continuously. Still alternatively, the individual may slide the selector switch to off mode so as to disable the nightlight 2.

The LEDs L1 to L6 of the illumination unit 3 will emit light automatically as sensed by the sensor thereof when experiencing a power outage, i.e., an absence of AC.

Further, the illumination unit 3 will be disabled when it senses a termination of the activating condition, such as the restoration of AC. Still further, the illumination unit 3 can be removed from the nightlight 2 to be used independently as a portable light. Preferably, the LEDs L1 to L6 of the illumination unit 3 emit light (i.e., turned on) immediately after removing from the nightlight 2. Still preferably, the sensor of the illumination unit 3 may disable the LEDs L1 to L6 (i.e., turned off) immediately after placing the illumination unit 3 in the nightlight 2 and electrically connecting thereto. An individual may turn off the illumination unit 3 by pressing the switch thereof after removing from the nightlight 2.

While the invention herein disclosed has been described by means of specific embodiments, numerous modifications and variations could be made thereto by those skilled in the art without departing from the scope and spirit of the invention set forth in the claims.

What is claimed is:

1. A light device comprising:
a nightlight unit adapted to operate in an automatic mode, an on mode, or an off mode;
an illumination unit comprising a sensor, the illumination unit being removably secured to the nightlight unit; and
a charging unit for charging the illumination unit,
wherein the illumination unit is adapted to come on automatically by operating in the automatic mode, continuously emit light by operating in the on mode, or stop emitting light by operating in the off mode;
wherein the illumination unit is adapted to come on automatically to emit light either when the sensor senses an activating condition in the form of an absence of AC (alternating current) or after removing from the nightlight unit;
wherein the sensor is adapted to disable the illumination unit either when sensing a termination of the activating condition or after placing the illumination unit in the nightlight unit and electrically connecting thereto; and
wherein the charging unit comprises a first winding, a second winding in the illumination unit, an input, a first voltage decreasing circuit, a first full-wave rectifier, a vibration circuit, and an output such that the AC energy from an electrical outlet is fed to the input, the voltage value of the AC energy is decreased by the first voltage decreasing circuit, voltage with decreased value is rectified and filtered by the first full-wave rectifier, the vibration circuit generates a vibration signal and sends same to the output, and the vibration signal is sent from the output to the first winding.

2. A light device comprising:
a nightlight unit adapted to operate in an automatic mode, an on mode, or an off mode;
an illumination unit comprising a sensor, the illumination unit being removably secured to the nightlight unit; and
a charging unit for charging the illumination unit,
wherein the illumination unit is adapted to come on automatically by operating in the automatic mode, continuously emit light by operating in the on mode, or stop emitting light by operating in the off mode;
wherein the illumination unit is adapted to come on automatically to emit light either when the sensor senses an activating condition in the form of an absence of AC (alternating current) or after removing from the nightlight unit;
wherein the sensor is adapted to disable the illumination unit either when sensing a termination of the activating condition or after placing the illumination unit in the nightlight unit and electrically connecting thereto; and
wherein the illumination unit further comprises a jack electrically connected to a second winding, an electromagnetic induction control circuit, a display control circuit, a half-wave rectifier, a voltage stabilizing circuit, at least one light-emitting diode (LED), and a lithium battery protection circuit such that the AC energy is transferred from the first winding to the second winding when electromagnetic induction is generated, the AC energy is rectified by the electromagnetic induction control circuit to control cut-off and conduction of the display control circuit, the half-wave rectifier is adapted to rectify the AC energy to generate direct current (DC) voltage, the voltage stabilizing circuit is adapted to stabilize and filter the DC voltage, the display control circuit is adapted to limit the value of the DC voltage for controlling on, off, and blinking of the at least one LED, and the lithium battery protection circuit is electrically connected to the display control circuit.

* * * * *